(No Model.)

T. WATKINS.
BARREL TAP.

No. 290,722. Patented Dec. 25, 1883.

Witnesses.
J. N. Piper
E. B. Pratt

Inventor
Thomas Watkins.
by R. H. Eddy att'y.

UNITED STATES PATENT OFFICE.

THOMAS WATKINS, OF PORTSMOUTH, NEW HAMPSHIRE.

BARREL-TAP.

SPECIFICATION forming part of Letters Patent No. 290,722, dated December 25, 1883.

Application filed July 25, 1883. (No model.)

*To all whom it may concern:*

Be it known that I, THOMAS WATKINS, of Portsmouth, in the county of Rockingham, of the State of New Hampshire, have invented a new and useful Improvement in Barrel-Taps; and I do hereby declare the same to be described in the following specification and represented in the accompanying drawings, of which—

Figure 1:
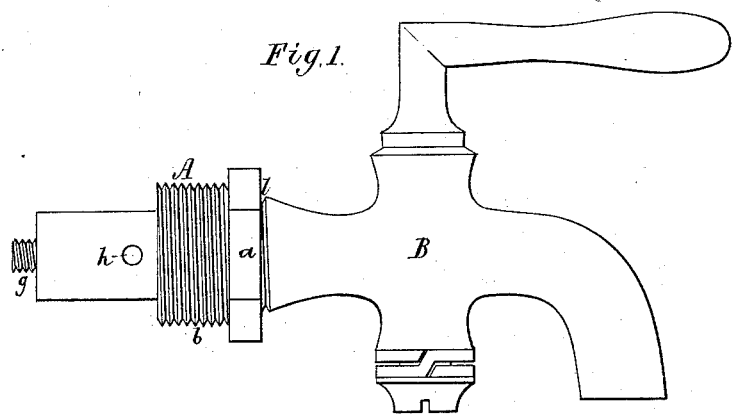
Figure 2:
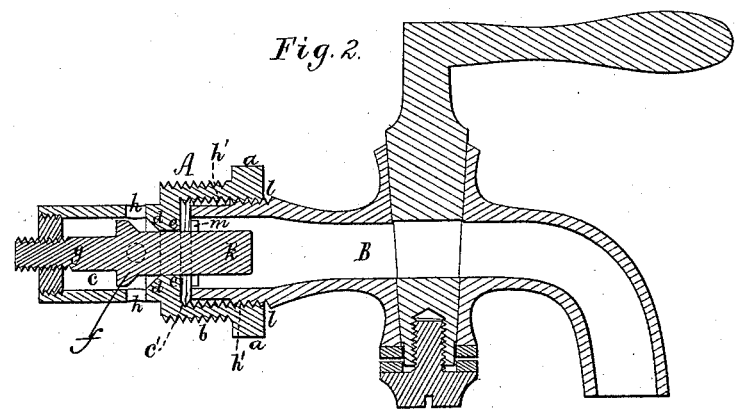
Figure 3:
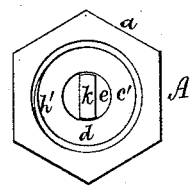
Figure 4:
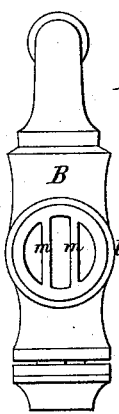

Figure 1 is a side view; Fig. 2, a longitudinal section of a tap and faucet provided with my improvement. Fig. 3 is an outer end view of the tap, and Fig. 4 is an inner end view of the faucet.

The nature of my invention is defined in the claims hereinafter presented.

The tap A is a plug provided with a prismatic head, $a$, and screw $b$ in rear thereof, for securing the tap in the head of a cask or barrel. Within the plug there are two chambers, $c$ and $c'$, separated by a partition, $d$, which has in it centrally a hole, $e$. The partition serves as a seat for a valve, $f$, whose stem $g$ screws through the rear end of the plug. In rear of the partition there are one or more holes, $h$, extending laterally into the chamber $c$. Furthermore, there is within the chamber $c'$, which is open at its front, a female screw, $h'$, and there extends from the valve forward through the hole $e$ and into the chamber $c'$ a flat or prismatic shank, $k$. The faucet or cock shown at B is provided near its rear or receiving end with a male screw, $l$, to engage with or screw into the screw $h'$, and there is extended across such end of the cock two bars, $m\ m$, arranged parallel to each other and at a distance apart equal to the thickness of the shank $k$. If, now, we suppose the tap to be inserted in the head of a cask, and we introduce the rear end of the faucet into the chamber $c'$ of the tap, the shank $k$ will enter the space between the bars $m\ m$, and on the faucet being revolved to screw it into the tap, the valve and its stem will be revolved, in which case the valve by the screw of the stem will be moved backward off its seat, and the liquid of the cask will enter and pass through the tap into the faucet, from which it may be discharged by opening such faucet.

In removing the faucet from the tap the valve will be revolved and forced against its seat, so as to arrest the flow of liquid through the tap.

I claim—

1. The tap chambered and provided with the prismatic head, the perforated valve-seat, one or more lateral holes, and the internal and external screws, arranged as described, in combination with the valve disposed within the rearmost chamber and provided with the prismatic shank, and having a stem screwed into the rear end of such chamber, all being substantially as set forth.

2. The tap having the two chambers, one or more lateral openings, the perforated valve-seat, the internal and external screws, and prismatic head, arranged as described, in combination with the valve disposed in the rear chamber, and provided not only with the prismatic shank to operate with the faucet-bars, but having its stem screwed into the rear end of such chamber, all being substantially as set forth.

3. The cock or faucet provided at its rear end with the screw and two cross-bars, arranged with such end as represented, in combination with the tap having the two chambers, one or more holes leading out of the rear one, the perforated valve-seat, prismatic head, internal and external screws, and the valve, with the screw, stem, and prismatic shank, all arranged and adapted substantially as set forth.

THOMAS WATKINS.

Witnesses:
 CALVIN PAGE,
 D. C. RICH.